Nov. 25, 1947. M. VAN WINKLE, JR 2,431,627
LOCK NUT
Filed Nov. 6, 1945

INVENTOR.
Marshall Van Winkle Jr.
BY
Brown & Seward
ATTORNEYS

Patented Nov. 25, 1947

2,431,627

UNITED STATES PATENT OFFICE 2,431,627

LOCK NUT

Marshall Van Winkle, Jr., Oceanport, N. J.

Application November 6, 1945, Serial No. 626,932

2 Claims. (Cl. 151—21)

This invention relates to a lock nut, and particularly such a nut of one-piece construction adapted to be manufactured rapidly on available automatic machinery.

An object of the invention is to provide such a nut which, when screwed home on a bolt with a normal torque, will so grip the bolt that it will not become loosened by vibration and other strains.

A further object is to provide such a nut which will not acquire an appreciable set in its gripping position, and which may therefore be readily removed and replaced as desired.

Another object is to provide such a nut which will bear evenly on the work and will not tend to score or dig into the work surface, particularly where the latter is of softer material than the nut.

A further object is to provide such a nut which can be applied efficiently by the various types of wrenches commonly used for this purpose, and in which a worn condition of the wrench has no adverse effect.

Another object is to provide certain improvements in the form, construction and arrangement of the several features of the nut whereby the above-named and other objects may effectively be attained.

A practical embodiment of the invention is shown in the accompanying drawing, in which.

Figure 1:
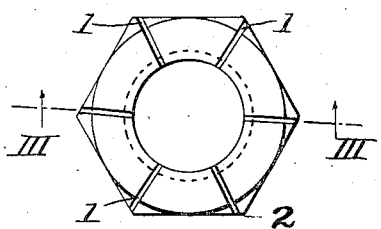
Fig. 1 represents a top plan view of a hexagon nut constructed according to the invention.
Figure 2:
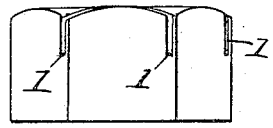
Fig. 2 represents a side elevation of the nut shown in Fig. 1.
Figure 3:
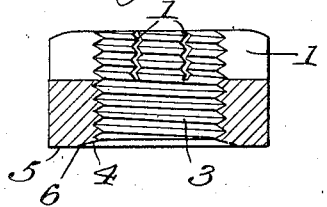
Fig. 3 represents a vertical section, taken on the line III—III of Fig. 1.

Referring to the drawings, and particularly Figs. 1 to 3, the nut is shown as being hexagonal and having substantially normal external dimensions. The upper part of the nut is provided with radial slots 1, which may be saw cuts, extending from the upper surface of the nut to a depth of slightly less than half the height of the nut; for example, the depth of cut may be .375×H to .490×H without materially changing the operation of the nut. The slots 1 are preferably disposed adjacent the corners 2 of the hexagon and slightly spaced therefrom on the leading side, considered with respect to the direction of rotation in applying the nut to a bolt. The expression "slightly spaced" may be further defined as indicating that the angle formed by the center line of the slot and a radius passing through the adjacent corner is less than the angle formed by the center line of the slot and a radius passing through the mid-point of the "flat"; that is, the slot is angularly nearer to the corner than it is to said mid-point.

The nut is internally threaded in the usual manner, as shown at 3. The base of the nut is provided with an annular recess or countersink 4, so that the threads 3 do not extend to the plane of the bearing surface 5, and the latter terminates inwardly at a circular line 6 having a diameter greater than the maximum thread diameter.

When the nut is applied to a bolt passing through a work piece and is screwed home thereon, the bearing surface 5 first comes in contact with the work and the downward motion of the nut is thus arrested. Upon the application of further force the nut is deformed, all the threads tending to move downward with respect to the surface 5 and the upper, slotted parts of the nut tending to be thrown radially inward so that the upper threads grip strongly the corresponding threads of the bolt. This is, in each radial plane of the nut, a kind of cantilever or bell-crank action, the fulcrum being at the bearing surface 5. The slotting of the upper part of the nut permits the several segments to move radially and to constitute gripping fingers which effectively prevent accidental loosening of the nut. The distortion, however, is not permanent and the nut returns to its normal condition when its bearing surface is removed from contact with the work.

The location of the slots adjacent the corners of the nut, i. e., in the thickest radial sections, tends to equalize the annular strength of the nut and the downward pressure exerted by all parts of the bearing surface 5. Thus, the corners of the bearing surface do not dig into the surface of the work even when the latter is relatively soft.

Figure 4:
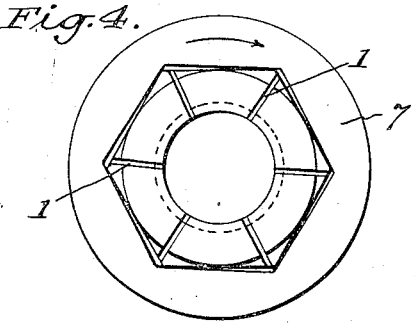
Fig. 4 represents a top plan view of the nut, as in Fig. 1, showing the operation thereof when being applied by means of a socket wrench.

A further advantage of this particular positioning of the slots is illustrated in Fig. 4, showing the nut being applied by means of a socket wrench 7, turning in the direction of the arrow. With either normal or excessive looseness of the wrench, its turning force will be applied largely or exclusively against the corners of the nut and the areas immediately in the rear of said corners, considered with respect to the direction of rotation. While such force serves primarily to tighten the nut on its bolt, with the cantilever action referred to above, a large component of the force is available for wedging radially inward the several segments constituting the upper part of the nut. The force being applied adjacent the corners of the nut (at one end of each segment) appears to gain, by leverage or otherwise, an unusual effectiveness in this respect, and nuts constructed as described are found to grip the bolt more tightly and resist removal or loosening more strongly than other types of nuts including those which are slotted at the middle of the "flat" in the customary manner. With the so-called "double hex" wrench, now commonly used, the action is the same as in the case of the wrench 7.

Figure 5:
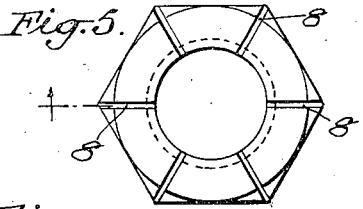
Fig. 5 represents a top plan view of a modified form of nut.
Figure 6:
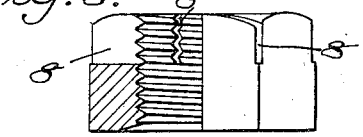
Fig. 6 represents a side elevation of the nut shown in Fig. 5, parts being cut away and in section.

In the modified form shown in Figs. 5 and 6 the slots 8 are formed at the corners of the nut, instead of slightly removed therefrom as in Figs. 1 to 4. The operation in both cases is the same, the modified form being theoretically preferable but subject to the practical disadvantages that the slots leave dangerously sharp edges at each corner and that the wrench surface may come in contact with the trailing corner of one segment before it has completed its action of forcing inward the leading corner of the following segment. Both of these disadvantages are overcome by placing the slots approximately as shown in Figs. 1 to 4.

It will be understood that various modifications may be made in the proportions, arrangement and form of the several features referred to without departing from the spirit and scope of the invention.

What I claim is:

1. A nut of the character described comprising a solid body having a plurality of uniformly spaced corners and a central cylindrical threaded bore, the under surface of the body being provided with a shallow recessed portion to form a continuous circular fulcrum bearing surface at the peripheral edge of the recessed portion, the upper portion of the body being provided with slots extending radially outwardly from the bore and intersecting said sides at points adjacent to, but spaced from, each of said corners on the leading side thereof.

2. A nut according to claim 1 in which the slots extend from the bore to points no more distant from the corners than one-half of the distance from the corner to the mid-point of the flat.

MARSHALL VAN WINKLE, Jr.

REFERENCES CITED

The following references are of record in the file of this patent:

UNITED STATES PATENTS

| Number | Name | Date |
|---|---|---|
| 1,734,445 | Place | Nov. 5, 1929 |

FOREIGN PATENTS

| Number | Country | Date |
|---|---|---|
| 826,037 | France | Dec. 27, 1937 |